Dec. 18, 1923.

E. E. DECKER

VENT VALVE FOR RADIATORS

Filed Nov. 11, 1920

1,478,028

INVENTOR
Edward E. Decker
BY Everett Rook
ATTORNEYS.

Patented Dec. 18, 1923.

1,478,028

UNITED STATES PATENT OFFICE.

EDWARD E. DECKER, OF ELIZABETH, NEW JERSEY.

VENT VALVE FOR RADIATORS.

Application filed November 11, 1920. Serial No. 423,478.

*To all whom it may concern:*

Be it known that I, EDWARD E. DECKER, a citizen of the United States, and a resident of Elizabeth, in the county of Union and State of New Jersey, have invented new and useful Improvements in Vent Valves for Radiators, of which the following is a specification.

This invention relates to a vent valve for radiators and the like which automatically allows the escape of air from a steam or hot water heating system and prevents the escape of steam or water therefrom after the air has been exhausted.

The objects of the invention are to provide a valve of the character described embodying novel features of construction whereby the valve is maintained in an open position while the same is cold to allow the free escape of air from a heating system therethrough and is automatically closed when steam or water enters the valve to prevent escape thereof through the valve; to secure a valve of this character which is quick and reliable in its operation and which is simple and inexpensive in construction; to provide a valve having a thermostatic element which maintains the valve in open position while the valve is cold to allow the escape of air, said thermostatic element being affected by a passage of steam or hot water into the valve to allow the valve to close, and being also actuated by a float when water enters the valve to allow the valve to close; to provide a valve of this character including a substantially U-shaped thermostatic element the arms of which engage a valve to hold it from its seat while the valve is cold to allow the escape of air, a float being provided to actuate said arms of the thermostatic element and allow the valve to close when water enters the valve, said thermostatic element being also affected by steam or hot water so as to allow the said valve to close; and to obtain other results and advantages as may be brought out by the following description.

Referring to the accompanying drawings, in which like numerals of reference indicate the same parts throughout the several views, Figure 1 is a top plan view of a valve constructed in accordance with my invention;

Figure 4 is a detached perspective view of the thermostatic spring element, and

Figure 1:
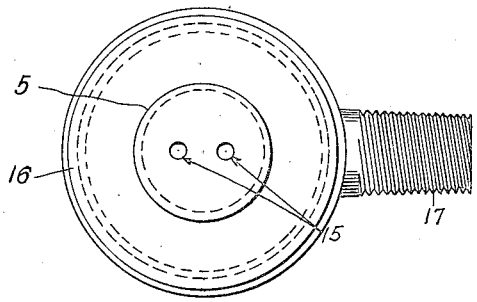
Figure 2:
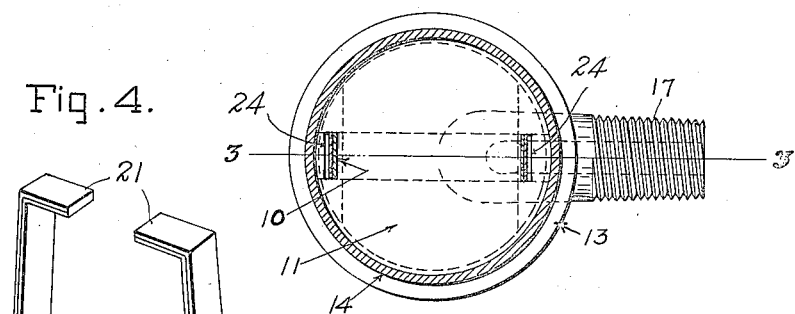
Figure 2 is a horizontal sectional view through the same taken on the line 2—2 of Fig. 3.

In the embodiment of my invention illustrated in the drawings, the numeral 14 designates a tubular casing which is closed at one end by a flanged cap 16 having an axial cylindrical extension 5 provided at the top thereof with a pair of openings 15 arranged upon opposite sides of the center of the cap. Upon the lower end of the casing 14 is fitted a base cap 13 provided at one side thereof with a threaded nipple 17 for attachment of the valve to a radiator or the like.

Figure 5:
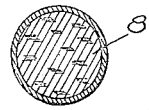
Figure 5 is a sectional view through the inner ball valve.

A valve sleeve 6 is screwed into the cylindrical extension 5 of the cap 16 and has a valve seat 18 arranged intermediate its length, an outwardly opening valve 7, preferably formed of aluminum, being adapted to cooperate with said valve seat 18. The inner end of the valve sleeve 6 is provided with a valve seat 19 with which is adapted to cooperate an inwardly opening ball valve 8, the said ball valve being preferably formed of cork and having an aluminum covering or casing as shown in Figure 5 of the drawing. This inner ball valve 8 is held in proper position with relation to the seat 19 by means of a supporting basket 9 which is substantially semi-spherical in shape and is secured to the inner end of the valve sleeve 6, said basket being provided at the inner side thereof with an opening 20 in which the ball 8 is adapted to rest when in an open position.

Figure 3:
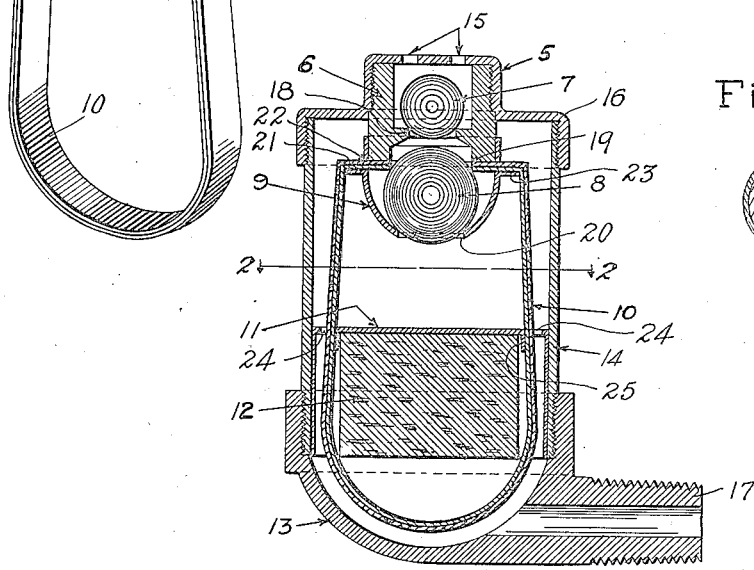
Figure 3 is a vertical longitudinal sectional view through the valve taken on the line 3—3 of Fig. 2.

A substantially U-shaped member 10 is arranged longitudinally of the casing 14, the said member being of any suitable construction whereby the arms thereof will be spread apart upon influx of heat into the casing and the arms thereof being inclined toward each other from their base toward the upper ends thereof. The outer extremities of the arms are bent at substantially right angles to the arms, as at 21, the said extremities 21 passing through slots 22 formed in diametrically opposite sides of the ball supporting basket 9 below the inner end of the valve sleeve 6, the said extremities 21 of the thermostatic element 10 engaging the ball valve 8 to hold the same from its seat 19 when the valve is in a cold condition. The slots 22 may be conveniently formed in the basket 9 by stamping the lugs 23 from the basket as shown in Figure 3 of the drawing, the said lugs serving as bearings for supporting the extremities 21 of the thermostatic element 10 and also limiting the inward movement of the arms of the thermostatic element 10.

A float 11 is slidably mounted within the casing 14 and preferably has a piston fit therein, the said float being substantially in the form of an inverted cup and having the top thereof formed with openings 24 to loosely receive the arms of the thermostatic element 10, the said openings 24 being preferably formed by stamping the bearing lugs 25 from the top of the float, the said bearing lugs serving to engage the inner sides of the thermostatic element 10. A block of cork 12 is mounted within the float 11 so as to more effectively raise the float when water enters the valve.

In the operation of the device if the heating system contains air and the pressure in the boiler is rising the thermostatic element 10 will maintain the ball valve 8 spaced from its seat 19 to allow the escape of air through the valve, the pressure of the air lifting the ball valve 7 from its seat and allowing the air to escape through the openings 15. The provision of a plurality of openings arranged as shown allows the air to escape without the usual objectionable whistling or hissing sound. If water enters the valve the float 11 is raised thereby, the lugs 25 engaging the inner sides of the arms of the thermostatic element 10 so as to spread the same from engagement with the ball valve 8 and thereby allow the valve 8 to close against its seat 19. The ball valve 8 is forced into engagement with its seat 19 by engagement of the float 11 therewith as it rises, and if sufficient water has escaped around the float 11 and through the openings 24 therein, the ball 8 will float into engagement with the seat 19. Escape of water from the valve is thus positively prevented. When steam enters the valve the heat thereof affects the thermostatic element 10 so as to cause the arms thereof to spread apart and allow the ball valve 8 to close, this spreading of the arms of the thermostatic element being allowed by the openings 24 in the float 11. When the ball 8 is thus released, the pressure of the steam forces the ball against the seat 19 to prevent escape of the steam from the valve. As the pressure in the heating system begins to recede a partial vacuum is created therein, whereupon the outer ball valve 7 is immediately drawn to its seat 18 so as to prevent the entrance of air into the system. Thus, when the pressure in the system again rises the hot water or steam will immediately ascend to the radiators, there being no air to obstruct the rapid rising of the steam or hot water as is the case where the system becomes filled with air when the pressure therein is reduced.

While I have shown and described one possible embodiment of my invention it will be understood that this is for the purpose of illustrating the principles of the invention only, and that many modifications and changes can be made in the detail construction of my invention by those skilled in the art without departing from the spirit or scope thereof. Accordingly, I do not wish to be understood as limiting myself except as required by the following claims when construed in the light of the prior art.

Having thus described the invention, what I claim is:

1. In a device of the character described, the combination of a casing having a valve seat therein, a valve to cooperate with said seat, thermostatic means for holding said valve away from said seat while the casing is cool and automatically releasing said valve upon influx of heat into said casing, and a float to actuate said valve holding means to release said valve upon influx of water into said casing.

2. In a device of the character described, the combination of a casing having a valve seat therein, a valve to cooperate with said seat, a substantially U-shaped thermostatic element having its arms adapted to engage said valve to hold it from said seat while said valve is cool and to automatically release said valve upon influx of heat into said casing, and means actuated by influx of water into said valve for spreading said arms to release said valve.

3. In a device of the character described, the combination of a casing having a valve seat therein, a valve to cooperate with said seat, a substantially U-shaped thermostatic element having its arms adapted to receive said valve between them to hold the valve from said seat while the casing is cool and to automatically release said valve upon influx of heat into said casing, and a float engaging and movable longitudinally of the said arms of the U-shaped element to spread them upon influx of water into said casing and release the said valve.

4. In a device of the character described, the combination of a casing having a valve seat therein, a valve to cooperate with said seat, a substantially U-shaped thermostatic element having its arms inclined toward each other from their base toward their ends, said arms being adapted to receive said valve between them and hold the same from its seat while the casing is cool and to automatically release said valve upon influx of heat into said casing, and a float mounted to slide longitudinally upon said arms, said float having a pair of spaced openings therein to slidably receive said arms to spread the said arms apart upon influx of water into said casing to release said valve.

5. In a device of the character described, the combination of a casing having a valve seat therein, a valve to cooperate with said seat, and a thermostatic element having a portion thereof interposed between said valve and said valve seat when the casing is cool to hold said valve away from said seat, said thermostatic element being actuated by an influx of heat into said casing to permit said valve to engage said seat.

6. In a device of the character described, the combination of a casing having a valve seat therein, a ball valve to cooperate with said seat, a basket mounted on said casing to normally support said ball valve adjacent said seat, and a thermostatic element having a portion thereof directly interposed between said ball valve and said seat when the casing is cool to hold said valve away from said seat, said thermostatic element being actuated by influx of heat into said casing to permit said valve to engage said seat.

7. In a device of the character described, the combination of a casing having a valve seat therein, a ball valve to cooperate with said seat, a basket mounted on said casing to normally support said ball valve adjacent said seat and formed with two diametrically opposite slots, and a U-shaped thermostatic element having the ends of its arms bent inwardly toward each other and slidable in said slots, said ends of the arms of the thermostatic element being directly interposed between said valve and said valve seat when the casing is cool, said thermostatic element being actuated by influx of heat into said casing to withdraw said ends from between said valve and said seat to permit said valve to engage said seat.

EDWARD E. DECKER.